United States Patent [19]

Blegen et al.

[11] 4,368,222

[45] Jan. 11, 1983

[54] VAPOR PERMEATION CURABLE COATINGS FOR SURFACE-POROUS SUBSTRATES

[75] Inventors: James R. Blegen, Worthington, Ohio; Helmut H. Zapfe, Mississauga, Canada; Eugene L. Bulgozdy, Dublin, Ohio

[73] Assignee: Ashland Oil, Inc., Dublin, Ohio

[21] Appl. No.: 270,896

[22] Filed: Jun. 5, 1981

[51] Int. Cl.$^3$ .............................................. B05D 3/04
[52] U.S. Cl. .................................... 427/340; 264/129; 427/393.5
[58] Field of Search ............................ 427/340, 393.5; 264/129

[56] References Cited

U.S. PATENT DOCUMENTS

| | | |
|---|---|---|
| 2,657,151 | 10/1953 | Gensel et al. |
| 2,967,117 | 1/1961 | Arlodfer et al. |
| 3,409,579 | 11/1968 | Robins |
| 3,429,848 | 2/1969 | Robins |
| 3,676,392 | 7/1972 | Robins |
| 3,789,044 | 1/1974 | Taft et al. |
| 3,822,226 | 7/1974 | Taft et al. |
| 3,836,491 | 7/1974 | Taft et al. |
| 3,874,898 | 4/1975 | McInnis et al. |
| 3,933,727 | 1/1976 | Schmid |
| 4,179,427 | 12/1979 | Gardikes |

FOREIGN PATENT DOCUMENTS

| | | |
|---|---|---|
| 1351881 | 5/1974 | United Kingdom |
| 1369351 | 10/1974 | United Kingdom |

*Primary Examiner*—Michael R. Lusignan
*Attorney, Agent, or Firm*—Mueller and Smith

[57] ABSTRACT

Disclosed is an improved method for coating a surface-porous substrate, e.g. an SMC substrate, with a film of curable coating composition and curing said film. The improvement comprises applying a film of the coating composition to the substrate wherein the coating composition comprises a phenol-functional compound and a multi-isocyanate curing agent therefor, and exposing the coated substrate to a vaporous tertiary amine catalyst to cure the applied film.

22 Claims, No Drawings

VAPOR PERMEATION CURABLE COATINGS FOR SURFACE-POROUS SUBSTRATES

BACKGROUND OF THE INVENTION

The present invention relates to coatings for surface-porous substrates and more particularly to an improved coating which possesses improved surface appearance and freedom from surface imperfections.

Surface porous substrates for present purposes comprehends substrates which have surfaces replete in microfissures, pinholes, or like imperfections, typically of microdimension imperceptible by the naked eye; though larger, visually perceptible voids and imperfections may be present also. Such surface imperfections typically arise due to techniques used in manufacturing the substrate and/or due to inherent physical or chemical limitations of ingredients used in manufacturing the substrate. Prime examples of surface-porous substrates are conventional sheet molding compounds (SMC), bulk molding compounds (BMC), and like materials. These compositions, often polyester-based with additives to suppress shrinkage, can contain fiberglass or other fibrous reinforcement and upon curing of the ingredients provide an ultimate part whose surface is replete in microvoids or microfissures. It must be recognized that additional plastic materials can provide surface porosity and it is conceivable that certain types of processed fiberboard or the like additionally will be classified as surface-porous according to the precepts of the present invention. It is conceivable that certain metals even may be surface-porous too.

Manufactured parts, eg. SMC, which contain surface porosity or surface-porous substrates for present purposes, can be very small articles of manufacture such as interior molded parts of automobiles on up to entire hoods or other large parts for trucks and cars. A problem pervading manufacturers of such parts today arises in coating such parts. Typically, a primer is applied to the surface-porous part and the applied film heat cured. Unfortunately, viscosity reduction of the applied film during the initial stages of heat curing or baking can cause penetration of the coating into the surface imperfections. As the temperature of the film increases during the bake cycle, the solvent portion of the coating in the minute pores or fissures pops or blows out due to the elevated temperature of the bake cycle or air trapped in such micropores escapes, both occurrences resulting in craters or pinholes in the coating. It is not unusual for such blistered coatings to be of such poor quality that the part need be sanded and recoated a repeated number of times. Clearly, great expense and great inefficiencies arise thereby. Thus, there is a need in the art for overcoming these and other problems associated with the coating of surface-porous substrates.

BROAD STATEMENT OF THE INVENTION

The present invention is a method for coating a surface-porous substrate with the film of a curable coating composition and curing said film. Such method comprises applying a film of a coating composition to said surface-porous substrate, said coating composition comprising a phenol-functional compound and a multi-isocyanate curing agent therefor. The coated substrate is exposed to a vaporous tertiary amine catalyst to rapidly cure the applied film at room temperature. Preferably, fillers or inert ingredients additionally are contained in the coating composition for improving adhesion of the coating composition to the surface porous substrate and for providing a conventional filling function.

Advantages of the present invention include the rapid cure of the coating at room temperature. Another advantage is the production of a film which is diminished in pinholing or blistering which is common to conventional heat cured coatings on surface-porous substrates. Another advantage is that the coating on the surface-porous substrate is glossier, cleaner, and reflects sharper images than conventional heat cured coatings. A further advantage is that such coating compositions are ideally suited as primers for surface-porous substrates and can have a top-coat applied thereto which top-coat also transmits less of the underlying surface imperfections typical of heat cured primers on surface-porous substrates. These and other advantages will become readily apparent to those skilled in the art based upon the disclosure contained herein.

DETAILED DESCRIPTION OF THE INVENTION

For present purposes, surface-porous substrates will be described with particularity relative to conventional sheet molding compound or SMC as such materials are typical of surface-porous substrates ideally intended for coating according to the precepts of the present invention. Sheet molding compound (SMC) is defined (ASTM) as a molding compound in integral sheet form comprising a thermosetting resin, fibrous reinforcement and additives required for processing or product performance; eg., resin, catalyst, thickener, mold release agent, particulate filler, pigment, and shrink control agent. It should be recognized, however, that such description herein is by way of illustration and not by way of limitation. It should be understood that the cure phenomena which creates improved appearance of the coatings on surface-porous substrates can be separated from polymer design which provides aggregate desirable properties of the cured applied film. That is, coatings cured by the vapor permeation curable system show a distinctly smoother and higher gloss surface than conventional heat cured coatings. Gloss top-coats applied thereto also provide an overall appearance of images which is sharper, clearer, and glossier than conventional heat cured coatings (eg. 20° head gloss values of 84 for an acrylic top-coat over a vapor permation cured primer versus 78.5 for the same top-coat over a heat-cured primer urethane have been measured, with values of 10 for the vapor permeation cured primer and 1 for the heat-cured urethane primer recorded). Further, visual perception of surface imperfections are further reduced whether the vapor permeation curable coating is viewed or a top-coat thereover is viewed. These improved effects result from coatings cured according to vapor permeation curable techniques almost without regard as to the particular polymer used in the coating. While several theories can be propounded as to why the vapor permeation curable technique provides such outstanding performance on surface-porous substrates, a precise explanation has yet to be determined. Currently favored theories can be proferred here by way of illustration and not limitation and such theories include that since no heat is applied, the coating does not become thinned for filling the microfissures or voids, eg. a limited penetration coating. Even if the voids are filled by the coating composition, cure is so rapid and at room temperature that no entrapped air or volatile solvent is rapidly vaporized or volatilized from the film. Thus, the surface imperfections are more effectively hidden or covered over. The rapid cure, e.g. in as little as 15–30 seconds, apparently is a key to the successful operation of the vapor permeation curable system utilized in the present invention.

Depending upon the particular substrate being coated and its intended use, specialized polymer design and cross-linking systems can be developed for providing specialized properties. Thus, the advantages of the present invention for providing a better visually appearing film as well as one substantially diminished in surface imperfections is achieved independent of many film properties which can be provided by the specialized design of the ingredients in the coating composition. Thus, one can formulate a coating system which is flexible, rigid, resistant to salt spray or rust, resistant to chipping, or like desirable properties almost independently of achieving the appearance benefits of the present invention involving the vapor permeation curable system. Such substantial independence of these two criteria indeed is unique in the coatings industry and of special benefit to the present invention.

A wide variety of conventional vapor permeation curable coating compositions have been developed and are suitable for use in the present invention. It must be recognized, though, that specially formulated vapor permeation curable coating compositions can be developed according to the precepts of the present invention.

Vapor permeation cure is a method for curing polyhydroxy polymers with a multi-isocyanate curing agent by exposure thereof to a vaporous tertiary amine catalyst at room temperature. Vapor permeation cure characteristics generally include extremely rapid cure times often ranging from as low as about 15–30 seconds and the ability to effect polymer cure at room temperature. Aromatic hydroxyl groups are preferred for the polyhydroxy polymer in order to enhance the speed of cure in the presence of the vaporous tertiary amine catalyst and in order to provide long pot lives of the composition of the polyisocyanate curing agent and polyhydroxy polymer without the need of a polymerization inhibitor. Vapor permeation curable coating compositions have been proposed heretofore and such compositions, often in modified form, are eligible candidates for use in coating surface-porous substrates according to the precepts of the present invention. For example, U.S. Pat. No. 2,967,117 shows a coating composed of a polyhydroxy polyester and a polyisocyanate which are cured in the presence of a gaseous tertiary amine or phosphine. U.S. Pat. Nos. 3,409,579, 3,429,848, and 3,676,392 deal with phenol-aldehyde resins particularly useful as binder compositions in curing foundry cores. A hydroxyl functional polyester may be end capped with hydroxybenzoic acid as taught in U.S. Pat. No. 3,836,491, a phenol reacted with an unsaturated resin as taught in U.S. Pat. No. 3,822,226, or an epoxy polymer capped with hydroxybenzoic acid as taught in U.S. Pat. No. 3,789,044. British Pat. No. 1,351,881 modifies a polyhydroxy, polyepoxy, or polycarboxyl resin with the reaction product of a phenol and an aldehyde. British Pat. No. 1,369,351 proposes a hydroxy or epoxy compound which has been reacted with diphenolic acid. Further, commonly assigned application Ser. No. 06/216,323, filed Dec. 15, 1980, now U.S. Pat. No. 4,343,839; patented Aug. 10, 1982 proposes a specially designed flexible polyester polymer which is ideally adapted for coating flexible substrates. Additionally, commonly assigned application of Linden and Kathiriya, U.S. Ser. No. 252,844, filed Apr. 10, 1981, proposes a coating composition of catechol or a catechol-derived adduct and a multi-isocyanate cross-linking agent for vapor permeation curable coating compositions. Further, in commonly assigned application of Linden, U.S. Ser. No. 240,984, filed on Mar. 5, 1981, proposes hydroxybenzoic acid-epoxy adducts for use in forming polyols ideally suited for use in vapor permeation cure technology. Taft et al proposes an unsaturated phenol-functional polymer containing ethylenic unsaturation, an ethylenically unsaturated diluent which is addition polymerizable with the ethylenic unsaturation of the polymer, and a multi-isocyanate cross-linking agent which is cured in the presence of a vaporous tertiary amine catalyst wherein additional catalysts, e.g., peroxides, in the composition catalyze the addition polymerization reaction at room temperature.

As the foregoing discussion of art demonstrates, a variety of vapor permeation curable coating compositions exist. Clearly, modification of the compositions taught in these citations may be required in order to tailor the compositions for specific surface-porous substrates and intended use of parts manufactured from such surface-porous substrates. Such, however, clearly is within the skill of those in this art.

While various of the coating compositions formulated according to the art may be desirable for use according to the present invention, certain variations on the formulations have been determined to be quite advantageous. A possible problem noted during development of the present invention was that adhesion of the vapor permeation cured coating on the surface-porous substrate was lacking on occasion. It is believed that such lack of adhesion may be due to excess shrinkage of the film due to the rapidity with which it is cured, though other explanations are possible. A presently preferred method for ensuring avoidance of excess shrinkage of the film and loss of adhesion involves the use of inerts or fillers in the coating composition. Such inerts or fillers are advantageous in the present coating compositions for their filling effect anyway, so that their use normally does not detract from coatings properties often desired. Such inerts or fillers include, for example, clays such as kaolin clay, asbestos, calcium carbonate, chromium oxide, barium sulfate, iron oxide, calcium sulfate, talc, mica, silicas, dolomite, antimony oxide, silicon dioxide, cadmium sulfide, cadmium selenide, lead chromate, zinc chromate, nickel titanate, diatomaceous earth, glass fiber, glass powder, glass spheres, and the like and mixtures thereof. These inerts, extenders, fillers, or like named compounds (including suitable organic fillers, eg. thermoplastics) can be inert in the system, can be a corrosion-inhibiting pigment (eg. various chromates), or can have some other special function (eg. adhesion promoters). Such fillers are, however, particulate and non-volatile in the formulation of the coating composition. It should be recognized that some fillers may tend to promote the curing reaction and diminish the pot life of the coating composition on some occasions, though, a balance must be struck between such promoting action and other beneficial effects which may be gained by inclusion of such active ingredients in the coating composition.

The aromatic-hydroxyl functional compound as noted above may be a polyester, polyether, acrylic copolymer, or other conventional monomer, oligomer, or polymer. Of importance in resin design, however, is that the phenol-functional compound be substantially free of reactive aliphatic hydroxyl groups. Aliphatic hydroxyl groups diminish the pot life of the coating composition as well as are slower to cure with the isocyanate curing agent in the presence of the catalyst. Thus, any aliphatic hydroxyl groups on the aromatic-hydroxyl functional compound should be sufficiently shielded (sterically hindered) so that they are substantially unreactive or non-participatory in the isocyanate curing reaction.

Multi-isocyanate cross-linking agents cross link with the aromatic hydroxyl groups of the polymer under the influence of a vaporous tertiary amine to form urethane linkages and to cure the coating. Aromatic isocyanates are necessary in order to obtain the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions may find utility in the invention. Multi-isocyanates preferably will have from about 2-4 isocyanate groups for use in the coating composition of the present invention. Suitable multi-isocyanates for use in the present invention include, for example, hexamethylene diisocyanate, toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic poly-isocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the phenol-functional compound to the isocyanate equivalents of the multi-isocyanate cross-linking agent broadly can range from about 0.5:1 to 1:2, advantageously 1:1 to 1:2, and preferably about 1:1.1 to 1:1.3. The precise intended application of the coating composition often will dictate this ratio or isocyanate index. At high cross-linking densities or isocyanate equivalents, harder but relatively inflexible films are produced while at lower cross-linking densities or isocyanate equivalents flexibility of the films increases. Optimizing the particular property or combination of properties desired can be determined as those skilled in this art will appreciate.

Usually a solvent or vehicle for the coating composition will be required and such solvent may be a volatile organic solvent or an aqueous solvent. Typical organic solvents include, for example, methyl ethyl ketone, acetone, methyl isobutyl ketone, ethylene glycol monoethyl ether acetate, xylene, toluene, and the like, and often mixtures thereof. The proportion of solvent, and hence the non-volatile solids content of the coating composition, depends upon factors including method of application, desired application viscosity, and the like factors.

A variety of additives can be included in the coating composition. The coating composition can contain opacifying pigments such as, for example, titanium dioxide. Additionally, the coating composition can contain corrosion inhibiting pigments, plasticizers, flow leveling agents, surfactants, tinctorial pigments, and a wide variety of conventional coating additives. The finally compounded coating composition (phenol-functional resin, curing agent, solvent, and optional additives) possesses an excellent pot life of at least 4 hours in an open pot and often on up to 8-18 hours or longer.

The coating composition of the present invention can be cured in the presence of a tertiary amine such as, for example, triethyl amine, dimethyl ethyl amine, cyclohexyl dimethyl amine, methyl diethyl amine, and the like, by exposure thereto for times ranging from as short as 5 seconds on up to 30 seconds or longer (eg. about 2 minutes) with thick films, eg. up to 3-4 mils wet, often being subjected to heating, eg. at 90°-120° C., to flash off excess volatile solvent in the applied film. The coating composition thus cured may be immediately handled without fear of deleterious tackiness or blocking of the cured film.

In practicing the present invention, the coating composition is applied to the substrate by direct roll coat or curtain coating with or without knife, reverse roller coat, atomized (eg. spray) application, or like conventional technique. Use of a two-head spray equipment is unnecessary since the coating composition of the present invention possesses such an excellent pot life. After the film is applied to the substrate, the coated substrate is passed through a zone or region which contains the vaporous tertiary amine. Representative vapor curing chambers for vapor curing the coating include those shown in U.S. Pat. Nos. 3,851,402 and 3,931,684, the disclosures of which are expressly incorporated herein by reference. The vaporous tertiary amine is admixed with a carrier gas, such as an inert gas like nitrogen or carbon dioxide, in order to facilitate its dispersion in the curing chamber as well as for minimizing the chance of explosion. The atmosphere in the curing chamber normally will contain the vaporous tertiary amine in a proportion of between about 2% and 12% with catalyst concentrations somewhere in the range of 4-8% being preferred. Room temperature may be maintained during the entire sequence of operations from coating, to curing of the coated substrate.

The cured coating on the surface-porous substrate can be the final coating or can serve as a primer wherein another coating is top-coated or over-coated thereon. Such top-coat can be any conventional aqueous, non-aqueous, powder, or the like coating composition cured by conventional techniques including, for example, heat, ionizing radiation (electron beam), ultra-violet radiation, or according to vapor permeation cure techniques. For example, when the surface-porous substrate is an SMC part desirably molded as a part for an automobile such as a hood or other part of a truck, conventionally an acrylic paint will be used to overcoat the vapor permeation cured primer of the present invention. Both the cured primer and the cured top-coat thereover display a distinctly smoother and higher gloss surface than substantially equivalent coating compositions which are heat cured on the surface-porous substrate. The images reflected in the primer and top-coat are sharper, clearer, and glossier, and the surface imperfections typical of heat cured primers are better hidden or covered compared to conventional heat cured primers. Moreover, the top-coated vapor permeation cured primer of the present invention on an SMC part has been determined to provide excellent condensing humidity protection even at extremely thin films, e.g. between 0.3 and 1 mil, with no loss of gloss or blistering over extended periods of time, eg. up to 10 months and longer. Also, gravelometer and chip resistance tests show that the coating system of the present invention can be superior to conventional heat cured coatings. Such attributes of the coated surface-porous substrates according to the present invention are a unique combination of properties which is not expected based upon conventional vapor permeation cure technology.

Since the SMC part may be adjacent to a part made of metal, fiberboard, resinous material particleboard, or the like, performance on such other material by the primer is desirable. Such performance has been demonstrated and provides additional benefits for the present invention, eg. corrosion inhibition, humidity resistance, etc. The coating further may be useful as a top-coat as well as a primer regardless of the type of substrate being coated.

The following examples will show how the present invention can be practiced but should not be construed as limiting. In this application, all units are in the metric system and all parts and percentages are by weight, unless otherwise expressly noted. Also, all citations herein are expressly incorporated herein by reference.

EXAMPLES

EXAMPLE 1

Several polyols (containing aromatic hydroxyl functionally) were synthesized according to the general reaction procedure described in Example 1 of Ser. No. 216,323, filed Dec. 15, 1980 (cited above), except that for polyols 186, 187, 196, and 198 the aromatic hydroxyl ingredient (diphenolic acid or polyether phenol) was added after the other ingredients already had been cooked. The polyol formulations are given below in Table 1.

TABLE 1

| Ingredient | 5 | 19 | 46 | 130 | 140 | 142 | 147 | 152 | 169 | 174 | 176 | 186 | 187 | 196 | 198 | 514 | 500 | 771 |
|---|---|---|---|---|---|---|---|---|---|---|---|---|---|---|---|---|---|---|
| POLYOL FORMULATIONS (moles) | | | | | | | | | | | | | | | | | | |
| Diphenolic Acid | 2 | 2 | — | 2 | — | — | 2 | 2 | 2 | 2 | 2 | 2 | 2 | — | — | 2 | — | 2 |
| Neopentyl Glycol | 2 | 2 | — | 2 | 2 | — | 2 | — | — | 2 | — | 2 | 4 | 5 | 5 | — | — | 2 |
| Adipic Acid | — | 2 | 7 | 2 | 2 | 7 | 1 | — | — | 2 | — | 2 | 4 | 4 | 3 | 7 | 7 | 2 |
| Azelaic Acid | 2 | — | — | — | — | — | — | — | — | — | — | — | — | — | — | — | — | — |
| Propylene Glycol | 1.1 | 1.1 | 6.1 | 1.1 | 1.1 | — | 1.1 | — | — | 1.1 | — | 1.1 | 2.1 | — | — | — | — | 1.1 |
| iso-Phthalic Acid | 1 | 1 | — | 1 | 1 | — | 2 | — | — | 1 | — | 1 | 2 | 4 | 5 | — | — | 1 |
| Cardura E[1] | 1 | — | — | 1 | 1 | — | 1 | 1 | 1 | 1 | 1 | 1 | 2 | 1 | 1 | — | — | 1 |
| α-Olefin Epoxide[2] | — | 1 | — | — | — | — | — | — | — | — | — | — | — | — | — | — | — | — |
| Phenolic Resin[3] | — | — | 2 | — | 2 | 2 | — | — | — | — | — | — | — | 2 | 2 | — | — | — |
| Trimethylol Propane | — | — | 2 | — | — | 2 | — | — | — | — | — | — | — | 2 | 2 | 2 | 2 | — |
| 1,4-Butane Diol | — | — | — | — | — | 6 | — | — | 1 | — | 1 | — | — | — | — | 6 | 6 | — |
| Maleic Anhydride | — | — | — | — | — | — | — | 1 | 1 | — | — | — | — | — | — | — | — | — |
| Fumaric Acid | — | — | — | — | — | — | — | — | — | 1 | — | — | — | 4 | — | — | — | — |
| Hexane Diol | — | — | — | — | — | — | — | 1 | — | — | — | — | — | — | — | — | — | — |
| Bis-Phenol A | — | — | — | — | — | — | — | — | — | — | — | — | — | — | — | — | 2 | — |

[1] Cardura E is a glycidyl ester of Versatic 911 acid which is reported to be a mixture of aliphatic, mostly tertiary, acids with 9-11 carbon atoms (Cardura and Versatic being trademarks of Shell Chemical Company, New York, New York)
[2] α-Olefin Epoxide is an epoxide derived from a $C_{16}$ alpha-olefin (Union Carbide Corp., New York, New York)
[3] Phenolic resin is a phenol formaldehyde resin corresponding to the phenolic benzylic ether resin of U.S. Pat. No. 3,948,824 and synthesized generally according thereto. Though such resin is particularly adapted for foaming, such characteristic is not considered important for present purposes. The following specifications apply to the phenolic polyol:

| | |
|---|---|
| Viscosity (25° C.) | 50,000 ± 25,000 cps. |
| $H_2O$ | <1.5% |
| OH no. | 500–550 |
| Color | light yellow, clear |
| % free phenol | <14% |
| % free formaldehyde | <0.5% |

An additional polyol formulated, identified as polyol 148, was a blend of 45% by weight of a novolac resin (para-tertiary-butyl phenol, bis-phenol A, formaldehyde in a 6:1:8 molar ratio, respectively, in xylene) and 55% by weight of an oil-free (polyester) alkyl resin (propylene glycol, phthalic anhydride, iso-phthalic acid, adipic acid in a molar ratio of 3.74:1.12:1.0:1.19, respectively, oxalic acid catalyst).

EXAMPLE 2

Five of the polyols of Example 1 were formulated into black primers especially adapted for priming SMC substrate (Crystic SMC, a glass-fiber reinforced polyester pre-impregnated compression molding material, Scott Bader Company Limited, Wollaston, England). The primers each were applied by conventional air spray techniques at a coating thickness of 0.6±0.2 mil and exposed to vaporous triethylamine catalyst (about 6% by volume) carried in a stream of nitrogen gas. A 30 second exposure to the vaporous catalyst was employed after which the coatings were evaluated at specific time intervals following cure. Each primer composition was formulated to maintain a predetermined pigment volume content (PVC) of about 42% for each primer and a hydroxyl to isocyanate ratio of B 1.0:1.1 for all primers except #7 which had a ratio of 1.0:1.3. The following table provides the composition of each primer and the test results obtained.

TABLE 2

| Ingredient | Primer (g) | | | | | |
|---|---|---|---|---|---|---|
| | 7 | 8 | 9 | 10 | 11 | 13 |
| Resin | | | | | | |

TABLE 2-continued

| Ingredient | 7 | 8 | 9 | 10 | 11 | 13 |
|---|---|---|---|---|---|---|
| Polyol 130 | — | — | — | — | — | 283 |
| Polyol 140 | — | — | 204 | — | — | — |
| Polyol 142 | — | — | — | 224 | — | — |
| Polyol 147 | — | — | — | — | 304 | — |
| Polyol 148 | 255.4 | 280.0 | — | — | — | — |
| Phthaloyl Chloride | 0.5 | 0.5 | 0.5 | 0.5 | 0.5 | 0.5 |
| Raven Black 1255[1] | 30.0 | 30.0 | 30.0 | 30.0 | 30.0 | 30.0 |
| Barytes X5R[2] | 823.0 | 823.0 | 823.0 | 823.0 | 823.0 | 823.0 |
| MEK[3] | 85 | 85 | 85 | 85 | 85 | 85 |
| Cellosolve Acetate[4] | 94 | 94 | 124 | 130 | 145 | 140 |
| Anti-Terra U[5] | 5 | 5 | 5 | 5 | 5 | 5 |
| Curing Agent | | | | | | |
| CB-60[6] | 332 | 308 | 356 | 331 | 233 | 259 |
| Performance Results | | | | | | |
| Cure[7] (30 sec.) | 8 | 6 | 7-8 | 8 | 7+ | 8 |
| Viscosity (sec. in #4 Ford Cup) | 53 | 61 | 67 | 84 | 78 | 45 |
| Adhesion | | | | | | |
| 2 hrs. | 5 | 3 | 6 | 6 | 5 | 8 |
| 24 hrs. | 9 | 7 | 8 | 7 | 9 | 9+ |
| Flexibility | | | | | | |
| 48 hrs | 3 | 5 | 7 | 7 | 9 | 9+ |

[1] Raven Black 1255 is a carbon black supplied by Columbian Chemical Company, a subsidiary of Cities Chemical Co., Tulsa, Oklahoma.
[2] Barytes X5R is very fine barium sulfate formerly supplied by NL Industries, now NL Chemicals, Hightstown, N.J..
[3] MEK is methyl ethyl ketone.
[4] Cellosolve Acetate is ethylene glycol monoethyl ether acetate, Union Carbide Corporation, Coatings Intermediates Division, New York, New York.
[5] Anti-Terra U is a proprietary pigment wetting agent of unknown composition for preventing pigment settling, supplied by Byk Mallinckrodt, Inc.
[6] CB-60 is Mondur CB-60 isocyanate curing agent which is an aromatic polyisocyanate (NCO equivalent of 10.0 to 11.0) compound, supplied by Mobay Chemical Company, Plastics and Coatings Division, Pittsburgh, Pa.
[7] Results for Cure, Adhesion, and Flexibility are based on a scale of 0-10 where 0 is failure and 10 is excellent; Cure results rate the degree of cure after 30 seconds exposure to the gaseous catalyst; Adhesion results rate adhesion of the cured primer to the SMC substrate 2 and 24 hours after cure; and Flexibility results are for 48 hours after cure.

The above-tabulated results demonstrate the performance potential for vapor permeation curable coatings on surface-porous substrates and SMC in particular. Of importance also is that all of the cured primers effectively covered the SMC substrate and evidenced no pinholing, cratering, or other surface imperfections which characterize heat cured coatings on SMC substrates. This effective, continuous, non-marred film was independent of the specific polyol in the primer and independent of the performance of each primer as noted above. That is, even primers which lack the desired degree of adhesion, flexibility, or other property still are characterized by providing a smooth, glossy, continuous film free of surface defects.

EXAMPLE 3

In this example, a standard saturated (polyol) polyester was compared to two different unsaturated (polyol) polyesters. The unsaturated polyols were diluted in styrene as a reactive diluent and each primer also contained catalysts to promote the addition polymerization reaction. Each primer was coated on the SMC substrate of Example 2 at a 0.6±0.2 mil film thickness and cured in the manner of Example 2. The composition of each primer and results obtained appear below.

TABLE 3

| Ingredient | 14 | 15 | 16 |
|---|---|---|---|
| Resin | | | |
| Polyol 174 | 283 | — | — |
| Polyol 169 | — | 195 | — |

TABLE 3-continued

| Ingredient | 14 | 15 | 16 |
|---|---|---|---|
| Polyol 176 | — | — | 195 |
| Phthaloyl Chloride | 0.4 | 0.4 | 0.4 |
| Raven Black 1255 | 30 | 30 | 30 |
| Barytes X5R | 823 | 823 | 823 |
| Cellosolve Acetate | 84 | — | — |
| Styrene | — | 100 | 100 |
| Cobalt Drier | — | 24 drops | 24 drops |
| MEK Peroxide | — | 60 drops | 60 drops |
| Curing Agent | | | |
| CB-60 | 259 | 218 | 218 |
| Cellosolve Acetate | 200 | 100 | 100 |
| MEK | 75 | 75 | 75 |
| Performance Results | | | |
| % Non-Volatiles | 69.6 | 82.99 | 82.99 |
| Cure (30 sec.) | 8 | 10 | 10 |
| Adhesion | 7 | 10 | 10 |
| Viscosity (sec. in #2 Zahn Cup) | 23 | 26 | 25 |
| Pot Life (hrs.) | 24 | 18 | 18 |

The above-tabulated results demonstrate that high solids primers can be formulated which provide excellent performance results especially on SMC substrates. Note the excellent pot life of each coating. Also, each primer provided a cured film which was free of surface defects and imperfections.

EXAMPLE 4

Because SMC and like surface-porous substrates often are used as parts adjacent to metal parts. The need arises for primers and top-coats which function effectively on both types of substrates equally well. In order to demonstrate the effectiveness of the polyols reported herein and the vapor permeation curable system to adapt to being used as top-coats and as primers on metal, hardboard, etc, a red enamel top-coat was formulated from polyol 771 (see Table 1) which is a different batch of Polyol 130 which was evaluated as an SMC primer in Example 2. The red enamel was applied directly to a Bonderite 37 (zinc phosphate treated) steel substrate at a film thickness of 0.6±0.2 mils and cured in the manner of Example 2. The steel substrate was not primed. The formulation of the red enamel appears below.

TABLE 4

| Ingredient | Proportion (g) |
|---|---|
| Resin A | |
| Polyol 771 | 250 |
| Hoechst Red F3RK70 Pigment | 100 |
| Anti-Terra U | 3 |
| Cellosolve Acetate | 150 |
| Resin B | |
| Polyol 771 | 235 |
| Cellosolve Acetate | 50 |
| MEK | 50 |
| Curing Agent | |
| CB-60 | 275 |
| MEK | 125 |

The Resin A package was ground to a Hegman grind of 7 and then dispersed in the Resin B package. The entire resin system then was added to the curing agent and reduced further with MEK to spray application viscosity.

The coated metal panel had a pencil hardness of HB to H, a reverse impact resistance of 92.12 cm-kg (80 inch-lbs), and a gloss (60° head) of 87.

To further demonstrate the adaptability of the vapor permeation cure technique and polyols reported herein to function effectively on SMC and metal substrates, additional formulations containing corrosion-inhibitive pigments were compounded and evaluated on various metal substrates. The formulations evaluated appear below:

Additional characterization of the coatings formulations was conducted by coating exterior grade hardboard with several primers and top-coats, and curing such primers and top-coats as described in the previous examples. The following primer formulation was used:

TABLE 5

| Ingredient | Primer (g) 1 | 2 | 3 | 4 | 5 | 6 | 7 | 8 | 9 | 10 |
|---|---|---|---|---|---|---|---|---|---|---|
| Resin | | | | | | | | | | |
| Polyol 514 | 330 | — | — | — | — | — | — | — | — | — |
| Polyol 771 | — | 283 | — | — | — | — | — | — | — | — |
| Polyol 196 | — | — | 283 | — | — | — | — | — | — | — |
| Polyol 187 | — | — | — | 283 | — | — | — | — | — | — |
| Polyol 198 | — | — | — | — | 195 | — | — | — | — | — |
| Polyol 64 | — | — | — | — | — | 283 | 283 | 283 | 283 | 283 |
| Raven Black 1255 | 30 | 30 | 30 | 30 | 30 | 30 | 30 | 30 | 30 | 30 |
| Barytes L290 | 800 | 800 | 800 | 800 | 800 | 760 | 760 | 760 | 760 | 760 |
| Anti-Terra U | 5 | 5 | 5 | 5 | 5 | 5 | 5 | 5 | 5 | 5 |
| MEK | 85 | 85 | 85 | 85 | — | 85 | 85 | 85 | 85 | 85 |
| Cellosolve Acetate | 44 | 95 | 95 | 95 | — | 95 | 95 | 95 | 95 | 95 |
| Styrene | — | — | — | — | 150 | — | — | — | — | — |
| MEK Peroxide | — | — | — | — | 80 drops | — | — | — | — | — |
| Cobalt (12%) | — | — | — | — | 16 drops | — | — | — | — | — |
| Moly White 212[(1)] Pigment | — | — | — | — | — | 40 | — | — | — | — |
| Busan 11 Pigment[(2)] | — | — | — | — | — | — | 40 | — | — | — |
| Strontium Chromate | — | — | — | — | — | — | — | 40 | — | — |
| Zinc Chromate | — | — | — | — | — | — | — | — | 40 | — |
| Oncor M-50 Pigment[(3)] | — | — | — | — | — | — | — | — | — | 40 |
| Curing Agent | | | | | | | | | | |
| CB-60 | 354 | 234 | 348 | 365 | 238 | 213 | 213 | 213 | 213 | 213 |
| Methyl Isobutyl Ketone | 300 | 300 | 300 | 300 | 300 | 300 | 300 | 300 | 300 | 300 |
| Viscosity (sec. in #2 Zahn Cup) | | | | | | | | | | |
| Initial | 28 | 26 | 27 | 28 | 23 | 26 | 27 | 28 | 29 | 30 |
| 1 hour | 33 | 27 | 39 | 54 | 26 | 33 | 33 | 34 | 30 | 41 |
| 2 hours | 38 | 29 | 43 | 76 | 29 | 47 | 45 | 68 | 30 | 65 |
| 3 hours | 53 | 31 | 80 | 198 | 32 | 67 | 60 | 168 | 29 | 78 |

[(1)]Moly White 212 pigment is a zinc molybdenum phosphate corrosion-inhibitive pigment supplied by the Sherwin-Williams Chemicals Division of Sherwin-Williams Co., Cleveland, Ohio.
[(2)]Busan 11 pigment is a barium meta-borate pigment, supplied by Buckman Laboratories, Inc., Memphis, Tenn.
[(3)]Oncor M-50 pigment is a lead silico chromate corrosion-inhibitive pigment, supplied by NL Chemicals, Hightstown, N.J.

The primers were applied to various types of steel substrates at film thicknesses of 0.6±0.2 mils and cured in the manner described in the previous examples. Corrosion-inhibiting pigment was used at conventional level of about 0.0474 kg/l (40 pounds/100 gal). The steel substrates were sandblasted steel, iron phosphated steel (Bonderite #1000), zinc phosphated steel (Bonderite #37), and polished cold rolled steel to which all coatings did not adhere. The following salt spray resistance test (ASTM D-1654-61) results for the primers were determined.

TABLE 6

| | SALT SPRAY RESISTANCE (HRS) | | |
|---|---|---|---|
| Primer | Sandblasted Steel | Iron Phosphated Steel | Zinc Phosphated Steel |
| 1 | 150 | 225 | 225 |
| 2 | 150 | 225 | 225 |
| 3 | 225 | 275 | 275 |
| 4 | 150 | 150 | 150 |
| 5 | 150 | 275 | 225 |
| 6 | 225 | 275 | 225 |
| 7 | 150 | 225 | 225 |
| 8 | 150 | 275 | 275 |
| 9 | 150 | 225 | 275 |
| 10 | 150 | 175 | 175 |

Primed steel panels having an acrylic top-coat applied over the primers have shown salt spray resistance exceeding 500 hours.

| Ingredient | Primer (g) |
|---|---|
| Resin | |
| 187 | 292.18 |
| Cellosolve Acetate | 200.00 |
| RHD 6 TiO$_2$[(1)] | 150.00 |
| NYTAL 300 Talc[(2)] | 300.00 |
| Barytes L-290 | 150.00 |
| Curing Agent | |
| CB 60 | 172.00 |
| Cellosolve Acetate | 30.00 |

[(1)]RHD 6 TiO$_2$ is an interior grade of TiO$_2$ pigment (ASTM D-476 II), supplied by Tioxide Canada, Inc., Sorel, Quebec, Canada.
[(2)]NYTAL 300 Talc is magnesium silicate supplied by R. T. Vanderbilt Co., Inc., Norwalk, Conn.

The primer was vapor permeation cured and then top-coated. The top-coats also were vapor permeation cured. The following top-coats were used.

TABLE 7

| Ingredient | Top-Coats (g) 1 | 2 | 3 | 4 | 5 | 6 | 7 |
|---|---|---|---|---|---|---|---|
| Polyol | | | | | | | |
| 186 | 285 | — | — | — | — | — | — |
| 186 | — | 285 | — | — | — | — | — |
| 186 | — | — | 285 | — | — | — | — |
| 187 | — | — | — | 285 | — | — | — |
| 500 | — | — | — | — | 285 | — | — |
| 5 | — | — | — | — | — | 285 | — |
| 19 | — | — | — | — | — | — | 285 |

TABLE 7-continued

| Ingredient | Top-Coats (g) | | | | | | |
|---|---|---|---|---|---|---|---|
| | 1 | 2 | 3 | 4 | 5 | 6 | 7 |
| R960 TiO₂⁽¹⁾ | 375 | — | — | — | — | — | — |
| RA67 TiO₂⁽²⁾ | — | 375 | — | — | — | — | — |
| RCR60 TiO₂⁽³⁾ | — | — | 375 | 375 | 375 | 375 | 375 |
| MPA 60 Xylene⁽⁴⁾ | 7.5 | 7.5 | 7.5 | 75. | 7.5 | 7.5 | 7.5 |
| Minex 7⁽⁵⁾ | 100 | 100 | 100 | 100 | 100 | 100 | 100 |
| Talc 399⁽⁶⁾ | 75 | 75 | 75 | 75 | 75 | 75 | 75 |
| Cellosolve Acetate | 100 | 100 | 100 | 100 | 100 | 100 | 100 |
| Curing Agent | | | | | | | |
| Mondur HC⁽⁷⁾ | 176 | 176 | 176 | 129.86 | 236.5 | 219.47 | 150.4 |
| Desmodur⁽⁸⁾ L2291A | 28.6 | 28.6 | 28.6 | 21.14 | 38.5 | 35.7 | 24.5 |

⁽¹⁾R960 TiO₂ is an exterior grade TiO₂ pigment (ASTM D-476 III or IV), E. I. DuPont de Nemours, Wilmington, Del.
⁽²⁾RA67 TiO₂ is an exterior grade TiO₂ pigment (ASTM D-476 III or IV), N. L. Chemicals.
⁽³⁾RCR60 TiO₂ is an exterior grade TiO₂ pigment (ASTM D-476 III or IV), Tioxide Canada, Inc.
⁽⁴⁾MPA 60 xylene is a proprietary anti-settling agent (40% non-volatile solids in xylene at 7.29 lb/gal density), N. L. Chemicals.
⁽⁵⁾Minex 7 is a clay-type filler (1.7 microns average diameter, 9.9 pH), Indusmin Chemicals.
⁽⁶⁾Talc 399 is fine-particle magnesium silicate, Whittaker, Clark & Daniels, Inc.
⁽⁷⁾Mondur HC isocyanate is the tetrafunctional reaction product of hexamethylene diisocyanate and toluene diisocyanate (11.5% NCO content, equivalent weight of 365, 60% solids in Cellosolve acetate/xylene), Mobay Chemical Company.
⁽⁸⁾Desmodur L-2291A isocyanate is an aliphatic polyfunctional isocyanate of the hexamethylene diisocyanate biuret type, Mobay Chemical Company.

The primed panels were subjected to accelerated weathering in a QUV cabinet and have passed 3,000 hours with no coating failure (only moderate chalking evident). Such performance has been stated to be equivalent to 15 years of exterior weathering of a panel placed at a south 45° angle in Southern Florida.

These additional evaluations demonstrate the versatility of the vapor permeation curable coatings for application to various substrates. This versatility is beneficial for use of the coatings on SMC and other surface-porous substrates because of their ability to be universally usable on items made from SMC parts and other (eg. metal) parts.

We claim:

1. In a method for coating a surface-porous substrate of a fibrous-reinforced molding compound with a film of a curable primer coating composition and curing said film, the improvement which comprises:
   (A) applying said film of said coating composition to said substrate, said coating composition comprising:
      (1) an aromatic-hydroxyl functional compound; and
      (2) a multi-isocyanate curing agent; and
   (B) exposing said coated substrate to a vaporous tertiary amine catalyst to rapidly cure said applied film at room temperature,
   said vaporous catalyst cured film being substantially free of surface imperfections.

2. The method of claim 1 wherein said coating composition is dispersed in a fugitive solvent.

3. The method of claim 2 wherein said solvent is a fugitive organic solvent.

4. The method of claim 2 wherein said aromatic-hydroxyl functional compound is a monomer, oligomer, or polymer.

5. The method of claim 1 wherein the molar ratio of aromatic hydroxyl groups to isocyanate groups is between about 1:1 and 1:2.

6. The method of claim 1 wherein said coating composition also contains a particulate filler.

7. The method of claim 1 wherein said substrate is sheet molding compound.

8. The method of claim 1 wherein a top-coated coating composition is applied over said cured coating and said top-coated is cured.

9. The method of claim 1 wherein said coating composition is applied by spraying.

10. The method of claim 6 wherein said filler comprises barium sulfate.

11. The method of claim 1 wherein said aromatic-hydroxyl functional compound is substantially free of reactive aliphatic hydroxyl groups.

12. The method of claim 1 wherein said film ranges in thickness between about 0.3 and 4 mils.

13. The method of claim 5 wherein said ratio is between about 1:1.1 and 1:1.3.

14. In a method for coating a composite object manufactured from a surface-porous fibrous-reinforced molded compound part and from a non surface-porous part selected from metal, resinous material, and ligno-cellulosic material, with a film of a primer coating composition and curing said film, the improvement which comprises:
   (A) applying said film of said coating composition to both said surface porous part and to said non surface-porous part, said coating composition comprising:
      (1) an aromatic-hydroxyl functional compound; and
      (2) a multi-isocyanate curing agent; and
   (B) exposing said coated parts to a vaporous tertiary amine catalyst to rapidly cure said applied film at room temperature,
   said vaporous catalyst cured film on said surface-porous part being substantially free of surface imperfections.

15. The method of claim 14 wherein said surface-porous part is a sheet molding compound (SMC) part and said non surface-porous part is metal.

16. The method of claim 14 or 15 wherein said coating composition is dispersed in a fugitive organic solvent.

17. The method of claim 14 or 15 wherein said coating composition contains a particulate filler.

18. The method of claim 15 wherein said coating composition contains a corrosion-inhibiting pigment.

19. The method of claim 15 wherein said coating composition is dispersed in a fugitive organic solvent, contains a particulate filler and a corrosion-inhibiting pigment, and is a primer for said parts; a top-coat is applied over said cured primer and said top-coat is cured.

20. The method of claim 19 wherein the ratio of aromatic hydroxyl groups to isocyanate groups is between about 0.5:1 and 1:2.

21. The method of claim 20 wherein said ratio is between 1:1 and 1:2.

22. The method of claim 21 wherein said curing agent contains both an aromatic and an aliphatic multi-isocyanate curing agent.

* * * * *